(12) United States Patent
Cornell et al.

(10) Patent No.: US 6,714,727 B1
(45) Date of Patent: Mar. 30, 2004

(54) CAMERA CAPABLE OF HAVING ALTERNATIVELY POSITIONED MODE INDICATOR

(75) Inventors: David J. Cornell, Scottsville, NY (US); Jude A. SanGregory, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/413,227

(22) Filed: Apr. 14, 2003

(51) Int. Cl.[7] .............................................. G03B 17/02
(52) U.S. Cl. .......................... 396/6; 396/201; 396/267; 396/281
(58) Field of Search ............................ 396/6, 201, 202, 396/267, 281, 296

(56) References Cited

U.S. PATENT DOCUMENTS

| | | | |
|---|---|---|---|
| 5,557,356 A | 9/1996 | Ishida et al. | |
| 5,761,541 A | 6/1998 | Constable et al. | |
| 6,006,037 A | * 12/1999 | Allen et al. | ..................... 396/6 |
| 6,222,995 B1 | 4/2001 | Uchida | |
| 6,259,861 B1 | 7/2001 | Boyd et al. | |
| 6,282,374 B1 | 8/2001 | Boyd et al. | |
| 6,330,396 B1 | 12/2001 | Boyd et al. | |
| 6,351,608 B1 | 2/2002 | Constable | |
| 6,424,803 B1 | 7/2002 | Mikami et al. | |
| 6,442,346 B1 | 8/2002 | Constable et al. | |
| 2002/0071666 A1 | 6/2002 | Smart et al. | |
| 2002/0191972 A1 | 12/2002 | Kamata | |
| 2002/0197069 A1 | 12/2002 | Tomizawa | |

* cited by examiner

*Primary Examiner*—David M. Gray
(74) *Attorney, Agent, or Firm*—Roger A. Fields (57) ABSTRACT

A camera is capable of being assembled with an alternately positioned mode indicator. The camera includes the following in order to achieve this objective. A support adapted to hold a mode indicator at any one of at least two different locations in order to enable the mode indicator to be alternatively positioned at the respective locations. A part having separate openings aligned with the respective locations at which the mode indicator can be alternatively positioned. And a cover covering each of the openings in the part except the opening aligned with the location at which the mode indicator is positioned, to allow the mode indicator to be sensed via that opening.

11 Claims, 6 Drawing Sheets

CAMERA CAPABLE OF HAVING ALTERNATIVELY POSITIONED MODE INDICATOR

FIELD OF THE INVENTION

The invention relates generally to photography, and in particular to cameras including a mode indicator such as a flash ready light.

BACKGROUND OF THE INVENTION

General

Film and cameras that are all in one, commonly referred to as disposable single-use or one-time-use cameras, have become well known. The one-time-use camera is a simple point-and-shoot type camera comprising a conventional film cartridge within a cartridge receiving chamber in a main body part, an unexposed film roll prewound from the film cartridge onto a film supply spool within a film supply chamber in the main body part, a film-exposing chamber between the cartridge receiving and film supply chambers in the main body part, a fixed-focus taking lens, a manually rotatable film winding thumbwheel coaxially engaged with a film winding spool inside the film cartridge, a single-blade shutter, a manually depressible shutter release button, a frame counter wheel that has a scale of decreasing frame count numbers and is incrementally rotated to successively view each frame count number, an anti-backup pawl that engages the frame counter wheel to prevent its reverse rotation, a direct see-through viewfinder having front and rear viewfinder lenses, and in some models an electronic flash. A pair of separate front and rear cover parts house the main body part between them to complete the camera. The rear cover part connects to the main body part and/or to the front cover part to make the main body part light-tight. Front and rear cover labels (or a decorative cardboard outer box) at least partially cover the front and rear cover parts and have separate openings for the taking lens, the front and rear viewfinder lenses, etc.

To take a picture, the shutter release button is manually depressed. This causes a spring-urged high-energy lever to be released to strike the shutter blade, which then pivots open to uncover an exposure aperture. A return spring connected to the shutter blade pivots the shutter blade closed to re-cover the exposure aperture. Also, a metering lever is pivoted out of spring-biased engagement with the thumbwheel in order to permit manual rotation of the thumbwheel in the film winding direction after the picture is taken. When the thumbwheel is rotated in a film winding direction, it similarly rotates the film winding spool inside the film cartridge to wind an exposed frame of the filmstrip from across the exposure chamber to inside the film cartridge and to advance an unexposed frame of the filmstrip from the unexposed film roll to across the exposure chamber. The rewinding movement of the filmstrip the equivalent of slightly more than one frame width rotates a metering sprocket in engagement with successive perforations in the filmstrip, to in turn incrementally rotate the frame counter wheel to view its next lower frame count number. Also, the high energy lever is re-cocked or re-set and the metering lever is pivoted into re-engagement with the thumbwheel. When the metering lever re-engages the thumbwheel, further manual rotation of the thumbwheel in the film winding direction is prevented and the camera is ready to take another picture.

When the maximum number of frames available on the filmstrip have been exposed and the filmstrip is completely wound into the film cartridge, the one-time-use camera is given to a photofinisher who breaks away a cover door portion of the car cover part from the main body part and removes the film cartridge with the exposed filmstrip from the cartridge receiving chamber. Then, he removes the exposed filmstrip from the film cartridge to develop the latent images and make prints for the customer. At least some of the camera parts may be recycled, i.e. reused, to remanufacture another camera.

Prior Art Problem

It is advantageous to recycle a used flash circuit board, when practical, for inclusion in a remanufactured camera because of the initial cost of the flash circuit board.

The problem exists, however, that flash ready lights may be at slightly different sites on otherwise similar flash circuit boards. This is due in part from the fact that one flash ready light may be a neon light and another flash ready light may be a light-emitting diode. Thus, a remanufactured camera may only be able to include a recycled flash circuit board that was originally in that camera.

SUMMARY OF THE INVENTION

Generally, according to the invention, a camera comprises:

a support adapted to hold a mode indicator at any one of at least two different locations in order to enable the mode indicator to be alternatively positioned at the respective locations;

a part having separate openings aligned with the respective locations at which the mode indicator can be alternatively positioned; and a cover covering each of the openings in the part except the opening aligned with the location at which the mode indicator is positioned, to allow the mode indicator to be sensed via that opening.

More specifically, according to the invention, a flash camera comprises:

a main body part adapted to support a flash circuit board having a flash ready light at either one of two alternative sites on the flash circuit board, so that the flash ready light is positioned in either one of two different locations when the flash circuit board is supported on the main body part;

individual light pipes optically aligned with the respective locations at which the flash ready light can be positioned on the main body part, to transmit light from the flash ready light regardless of which location it is positioned;

a rear cover part having respective openings aligned with the light pipes; and a cover label on the rear cover part concealing each of the openings in the rear cover part except the opening aligned with the light pipe aligned with the location at which the flash ready light is positioned, to allow the flash ready light to be sensed via that opening.

Therefore, the camera according to the invention (as compared to one in the prior art) is not limited, when remanufactured, to a recycled flash circuit board that was originally in the camera.

DETAILED DESCRIPTION OF THE INVENTION

The invention is disclosed as being embodied preferably in a disposable one-time-use flash camera. Because the features of a one-time-use flash camera are generally known, the description which follows is directed in particular only to those elements forming part of or cooperating directly with the disclosed embodiment. It is to be understood, however, that other elements may take various forms known to a person of ordinary skill in the art.

Figure 2:
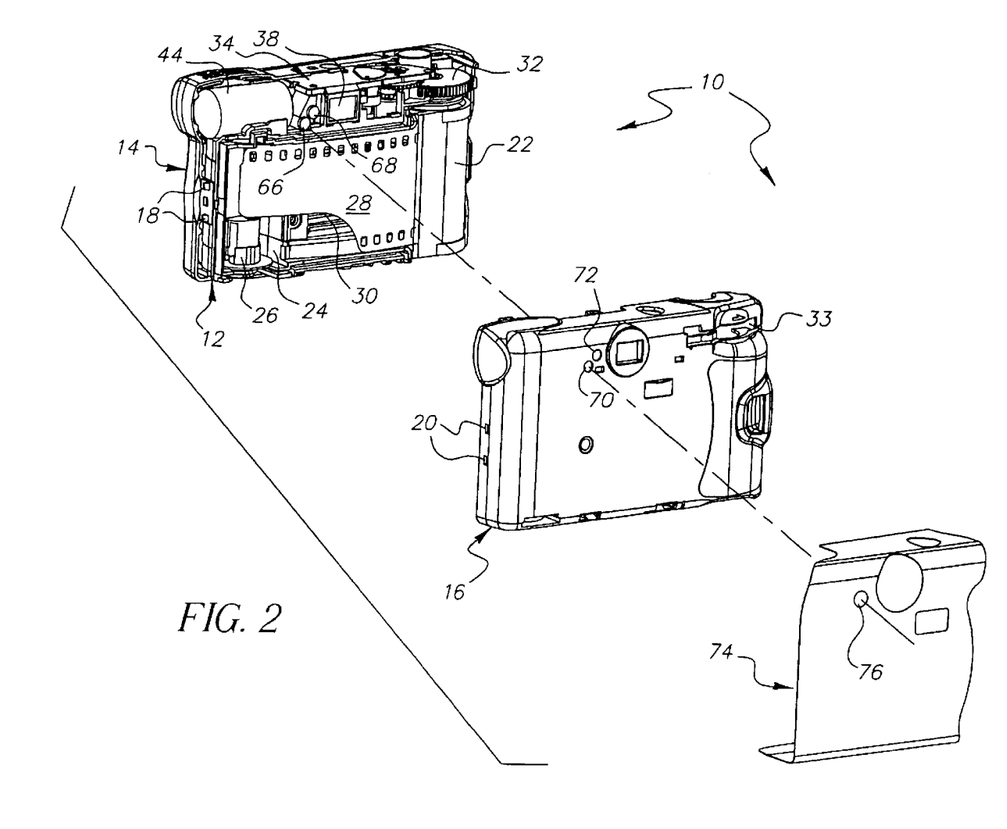
FIGS. 2 and 3 are rear perspective views of the camera, showing the camera with a flash ready light at one location on a main body part.

Referring now to the drawings, FIG. 2 rearwardly shows a disposable one-time-use flash camera 10 including an opaque main body part 12, an opaque front cover part 14, and an opaque exterior rear cover part 16. The front cover part 14 and the rear cover part 16 house the main body part 12 between them and are connected releasably to one another and to the main body part 12 via known-type hook-in-hole connections 18 and 20 (partially shown).

As is typical, the main body part 12 has a rearwardly open cartridge receiving chamber (not shown) for a 35 mm film cartridge 22 and a rearwardly open film supply chamber 24 for an unexposed film roll (not shown) on a rotatable film supply spool 26. See FIG. 2. During assembly of the camera 10, an unexposed filmstrip 28 is substantially prewound off a rotatable film winding spool inside the film cartridge 22 and into the unexposed film roll on the film supply spool 26. A rearwardly open exposure chamber 30 in the main body part 12 is located between the cartridge receiving chamber and the film supply chamber 26 for exposing successive frames of the filmstrip 28 across the exposure chamber, when ambient light is received through a front fixed-focus taking lens (not shown) and into the exposure chamber.

A film winding thumbwheel 32, rotatably supported on the main body part 12, coaxially engages the film winding spool inside the film cartridge 22 and peripherally protrudes from an elongate narrow opening 33 in the rear cover part 16. See FIG. 2. When the thumbwheel 32 is manually rotated in a film winding direction, i.e. counter-clockwise in FIG. 2, it similarly rotates the film winding spool inside the film cartridge 22. This is done in order to wind an exposed frame of the filmstrip 28 from across the exposure chamber 30 to into the film cartridge 22, after a picture is taken, and to move a fresh frame of the filmstrip from the unexposed film roll on the film supply spool 26 to across the exposure chamber, to take another picture.

A single-piece viewfinder unit 34 having front and rear viewfinder lenses 36 and 38 is mounted atop the main body part 12. See FIGS. 1 and 2. When taking a picture, one views the subject to be photographed by looking through the rear viewfinder lens 38 and the front viewfinder lens 36, towards the subject.

Figure 1:
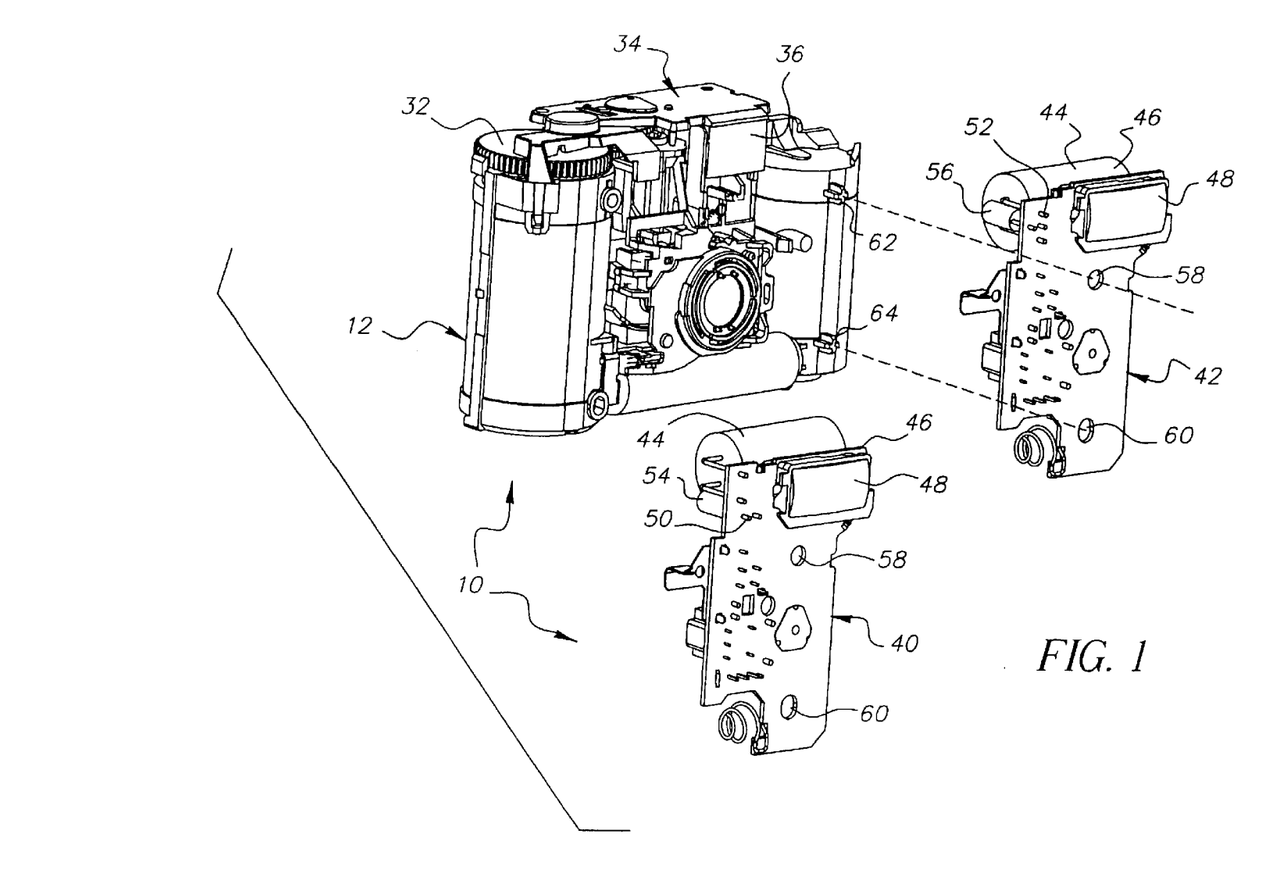
FIG. 1 is an exploded front perspective view of a one-time-use camera (partially shown) according to a preferred embodiment of the invention.
Figure 3:
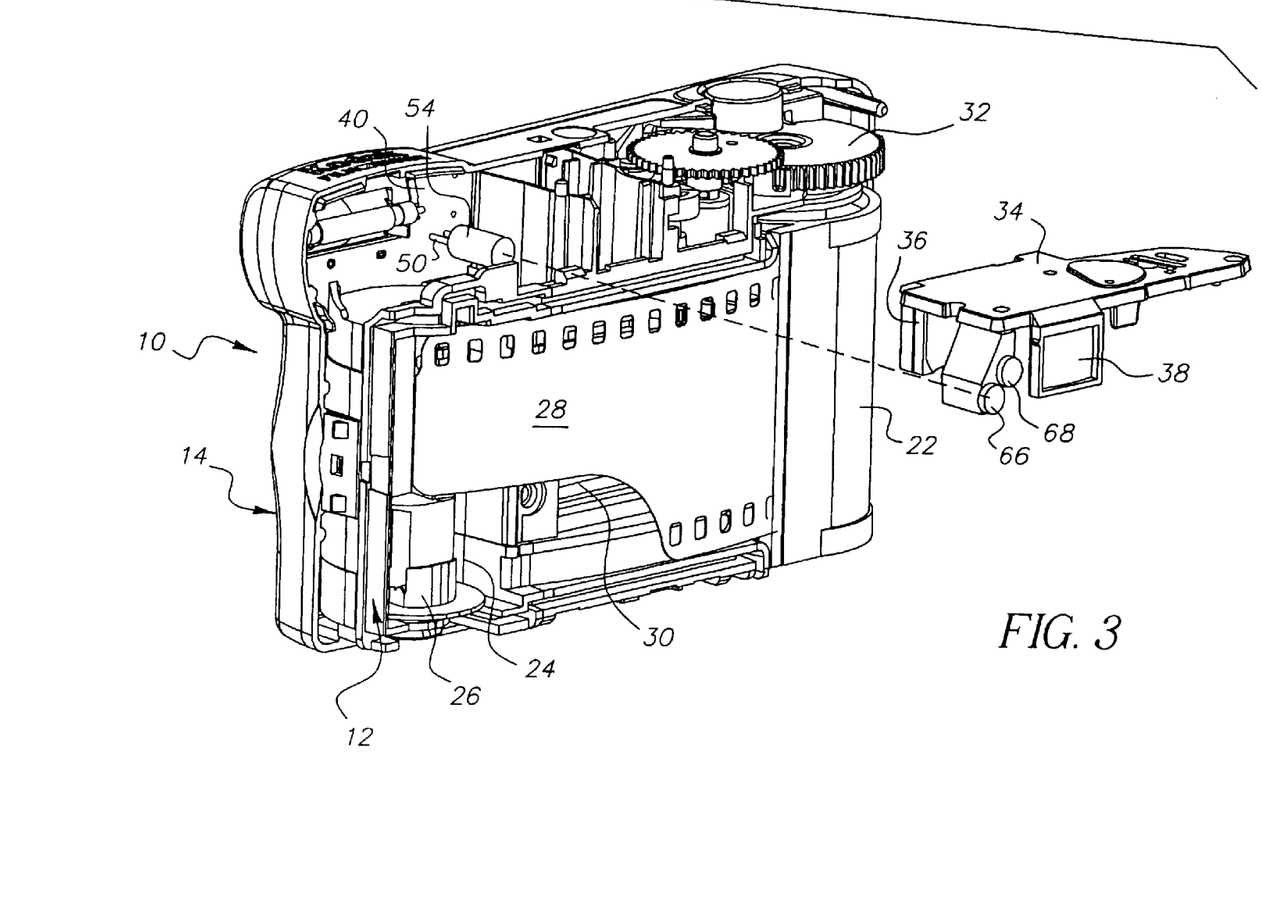
Figure 5:
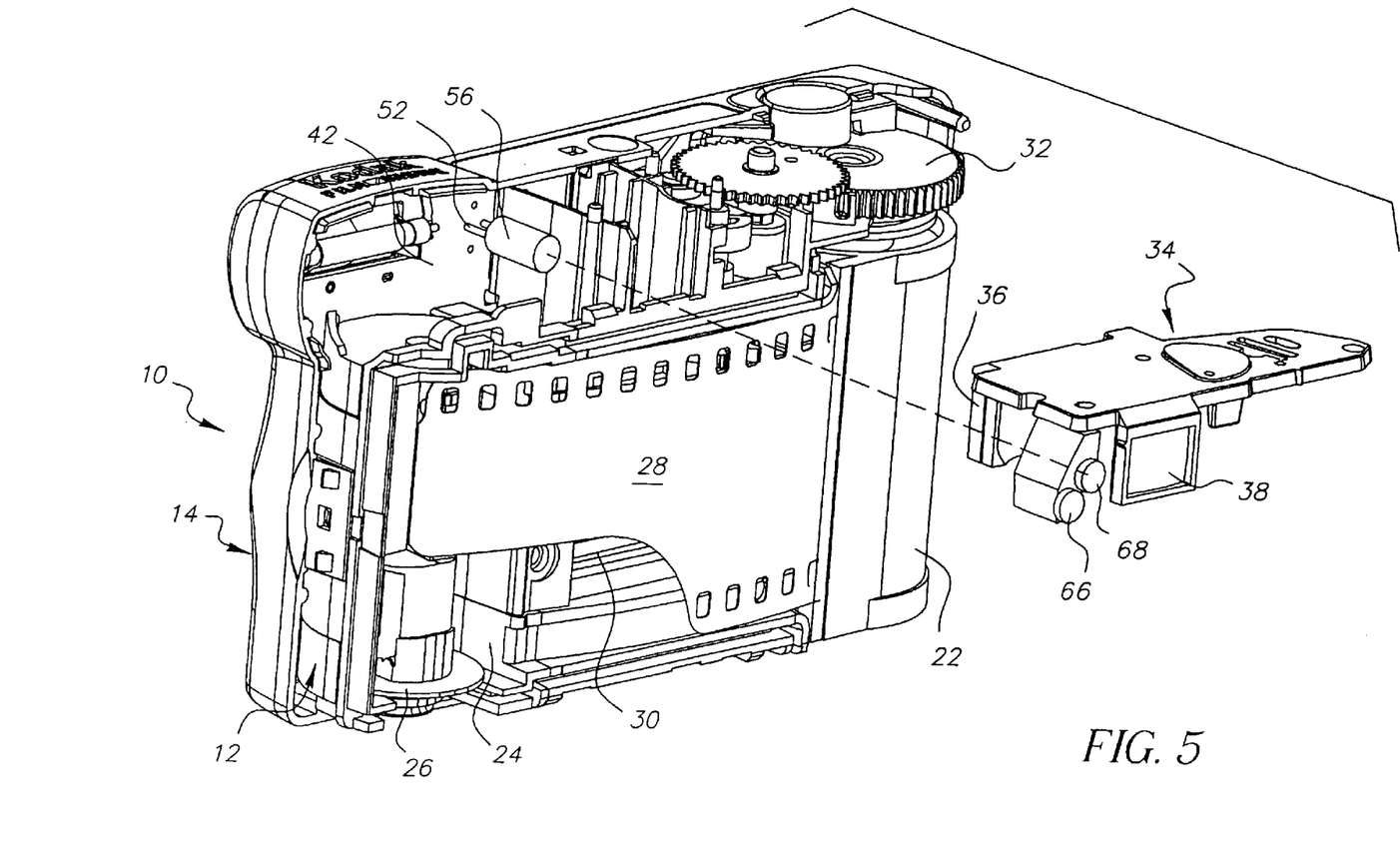

FIG. 1 shows two flash circuit boards 40 and 42 that may alternatively be included in the camera 10. The flash circuit boards 40 and 42 are for the most part the same. See an identical rear capacitor 44, an identical front flash reflector 46, and an identical front flash emission lens 48, for example, similarly mounted on each of the flash circuit boards 40 and 42. The flash circuit boards 40 and 42 can be distinguished, however, slightly different sites 50 and 52 at which rear flash ready lights 54 and 56 are mounted on the respective boards. See FIGS. 1, 3, and 5. Either one of the flash circuit boards 40 and 42 can be similarly supported on the main body part 12 by inserting respective holes 58 and 60 in the boards onto mating front pins 62 and 64 on the main body part. See FIG. 1. The pins 62 and 64 in the holes 58 and 60 serve to hold either one of the flash circuit boards 40 and 42 on the main body part 12 so that the flash ready lights 50 and 52 are positioned in either one of two slightly different locations on the main body part 12, as shown in FIGS. 3 and 5. In FIG. 3, the flash ready light 54 is positioned at a location on the main body part 12 that substantially coincides with the site 50 at which the flash ready light is mounted on the flash circuit board 40. In FIG. 5, the flash ready light 56 is positioned at a location on the main body part 12 that substantially coincides with the site 52 at which the flash ready light is mounted on the flash circuit board 42.

Figure 4:
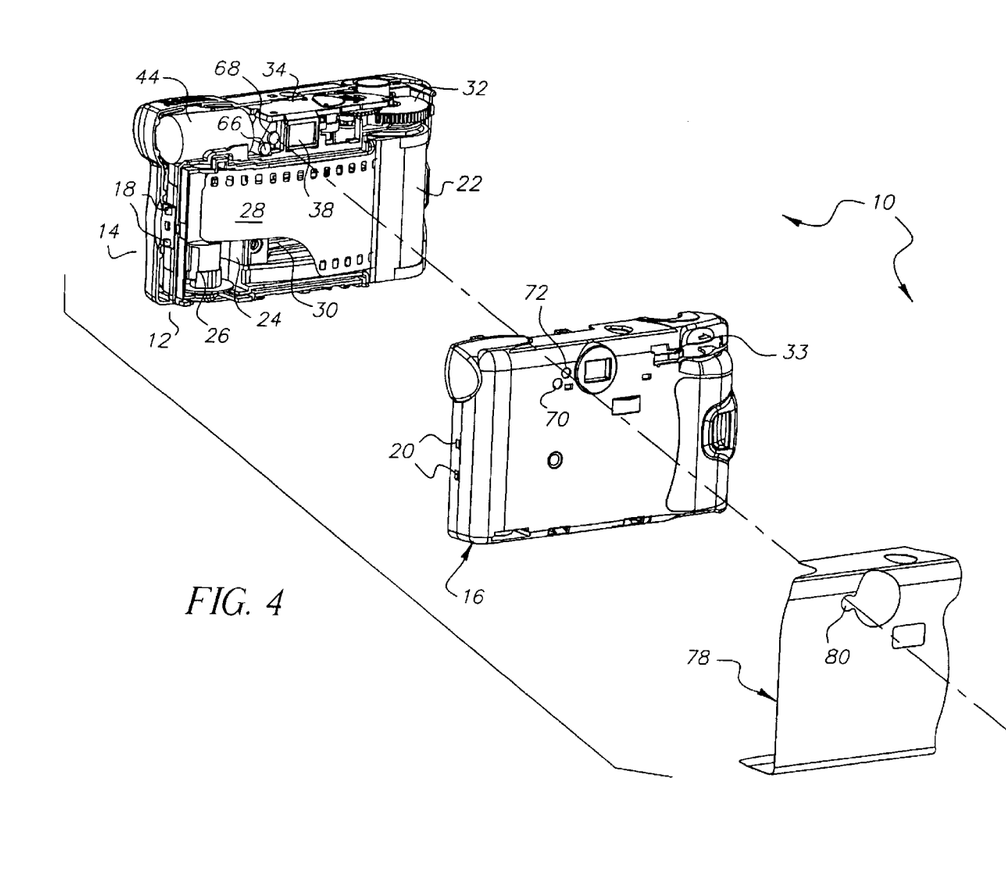
FIGS. 4 and 5 are rear perspective views of the camera, showing the camera with a flash ready light at another location on a main body part.

As shown in FIGS. 2-5, the single-piece viewfinder unit 34 includes integrally formed, parallel, light pipes 66 and 68 optically aligned with the respective locations on the main body part 12 at which the flash ready lights 54 and 56 can be alternatively positioned, to transmit light rearward from whichever one of the flash ready lights is present on the main body (regardless of which location it is in). In FIGS. 2 and 3, the light pipe 66 is in line with the flash ready light 54 on the board 40. In FIGS. 4 and 5, the light pipe 68 is in line with the flash ready light 56 on the board 42.

The rear cover part 16 has respective openings 70 and 72 optically aligned with the light pipes 66 and 68. See FIGS. 2 and 4.

Figure 6:
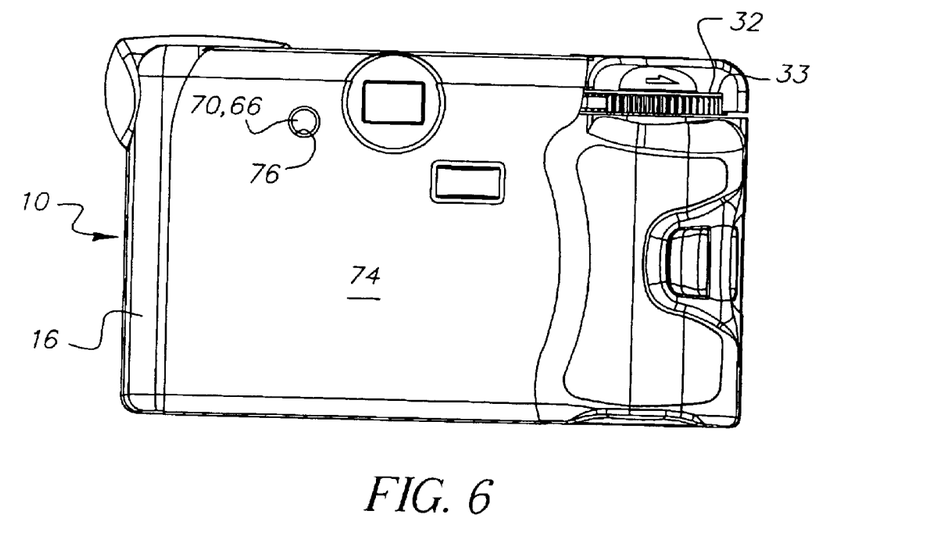
FIGS. 6 and 7 are rear elevation views of the camera, showing alternate rear cover labels for the camera as in FIGS. 2 and 3 and as in FIGS. 4 and 5.

As shown in FIGS. 2 and 6, a rear cover label 74 on the rear cover part 16 conceals the opening 72 in the rear cover part from view, and therefore it also conceals the light pipe 68 from view. However, the rear cover label 74 has an opening 76 aligned with the opening 70 in the rear cover part 14, and therefore it also is aligned with the light pipe 66 which in turn is aligned with the flash ready light 54 on the flash circuit board 40. Thus, the flash ready light 54 can be visually sensed via the opening 76 in the rear cover label 74.

Figure 7:
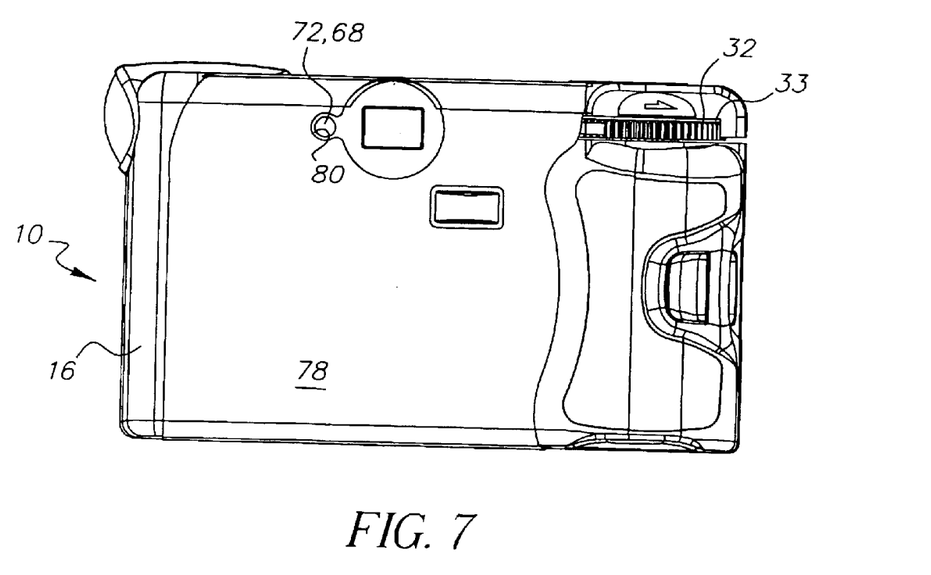

As shown in FIGS. 4 and 7, an alternative rear cover label 78 on the rear cover part 16 conceals the opening 70 in the rear cover part from view, and therefore it also conceals the light pipe 66 from view. However, the rear cover label 78 has an opening 80 aligned with the opening 72 in the rear cover part 16, and therefore it also is aligned with the light pipe 68 which in turn is aligned with the flash ready light 56 on the flash circuit board 42. Thus, the flash ready light 56 can be visually sensed via the opening 80 in the rear cover label 78.

The invention has been described in detail with particular reference to certain preferred embodiments thereof, but it will be understood that variations and modifications can be effected within the spirit and scope of the invention. For example, although the light pipes 66 and 80 must be optically aligned with the flash ready lights 54 and 56 and with the openings 70 and 72 in the rear cover part 16 as depicted in FIGS. 2-5, the light pipes need not be formed in a straight line or be parallel. Moreover, it is not necessary that the flash circuit boards 40 and 42 be the same size.

PARTS LIST 10. one-time-use camera
12. main body part
14. front cover part
16. rear cover part
18. pins 20. holes
22. film cartridge
24. film supply chamber
26. film supply spool
28. unexposed filmstrip
30. film exposure chamber
32. film winding thumbwheel
33. narrow opening
34. single-piece viewfinder unit
36. front viewfinder lens
38. rear viewfinder lens
40. flash circuit board
42. flash circuit board
44. capacitor
46. flash reflector
48. flash emission lens
50. site/location
52. site/location
54. flash ready light
56. flash ready light
58. hole
60. hole
62. pin
64. pin
66. light pipe
68. light pipe
70. opening
72. opening
74. rear cover label
76. opening
78. rear cover label
80. opening

What is claimed is:

1. A camera comprising:

a support adapted to hold a mode indicator at any one of at least two different locations in order to enable said mode indicator to be alternatively positioned at the respective locations, so that said mode indicator is positioned at only one of such locations;

a part having separate openings aligned with the respective locations at which said mode indicator can be alternatively positioned; and a cover covering each of said openings in said part except the opening aligned with the location at which said mode indicator is positioned, to allow said mode indicator to be sensed via that opening.

2. A camera as recited in claim 1, wherein said mode indicator is a light-generating indicator, and individual light pipes are aligned with the respective locations at which said mode indicator can be alternatively positioned and with said openings in said part in order to transmit light from said mode indicator to the opening aligned with the location at which said mode indicator is positioned.

3. A camera as recited in claim 2, wherein said light pipes are integrally formed with front and rear viewfinder lenses to constitute a single-piece construction.

4. A camera as recited in claim 2, wherein said light-producing indicator is a flash-ready light on a flash circuit board.

5. An assemblage for constructing a camera capable of having an alternatively positioned mode indicator, said assemblage comprising:

a support adapted to hold a mode indicator at any one of at least two different locations on said support to enable said mode indicator to be alternatively positioned at the respective locations, so that said mode indicator is positioned at only one of such locations;

a part that can be connected to said support to align separate openings in said part with the respective locations at which said mode indicator can be alternatively positioned; and a cover adapted to cover each of said openings in said part except the opening aligned with the location at which said mode indicator is positioned, to allow said mode indicator to be sensed via that opening.

6. An assemblage as recited in claim 5, wherein said mode indicator is a light-generating indicator, and individual light pipes can be connected to said support and to said part to be aligned with the respective locations at which said mode indicator can be alternatively positioned and with said openings in said part in order to transmit light from said mode indicator to the opening aligned with the location at which said mode indicator is positioned.

7. A method of assembling a camera capable of having an alternatively positioned mode indicator, said method comprising:

positioning a mode indicator at any one of at least two different locations so that said mode indicator is positioned at only one of such locations;

aligning separate openings with the respective locations at which said mode indicator can be positioned; and covering each of the openings except the opening aligned with the location at which the mode indicator is positioned, to allow the mode indicator to be sensed via that opening.

8. A method as recited in claim 7, further comprising:

aligning individual light pipes with the respective locations at which the mode indicator can be positioned and with the openings in order to allow the mode indicator to be sensed via one of the light pipes.

9. A camera comprising:

a support adapted to hold a light-generating mode indicator at any one of at least two different locations on said support in order to enable said mode indicator to be alternatively positioned at the respective locations;

individual light pipes optically aligned with the respective locations at which said mode indicator can be alternatively positioned, to transmit light from said light-producing indicator regardless of which location it is positioned; and a cover concealing each of said light pipes except the light pipe aligned with the location at which said mode indicator is positioned, to allow said mode indicator to be sensed via that light pipe.

10. A camera as recited in claim 9, wherein a part has respective openings aligned with said light pipes, and said cover covers each of said openings except the opening aligned with the light pipe aligned with the location at which said mode indicator is positioned in order to conceal each of said light pipes except the light pipe aligned with the location at which said mode indicator is positioned.

11. A flash camera comprising:

a main body part adapted to support a flash circuit board having a flash ready light at either one of two alternative sites on said flash circuit board, so that said flash ready light is positioned in either one of two different locations when said flash circuit board is supported on said main body part;

individual light pipes optically aligned with the respective locations at which said flash ready light can be positioned on said main body part, to transmit light from said flash ready light regardless of which location it is positioned;

a rear cover part having respective openings aligned with said light pipes; and a cover label on said rear cover part concealing each of said openings in said rear cover part except the opening aligned with the light pipe aligned with the location at which said flash ready light is positioned, to allow said flash ready light to be sensed via that opening.

* * * * *